United States Patent [19]
Welty, Jr. et al.

[11] 3,880,983
[45]*Apr. 29, 1975

[54] FLUE GAS DESULFURIZATION WITH AMMONIUM SULFITE-BISULFITE SOLUTION

[75] Inventors: Albert B. Welty, Jr., Westfield; Lindsay I. Griffin, Jr., Summit, both of N.J.

[73] Assignee: Exxon Research and Engineering Company, Linden, N.J.

[ * ] Notice: The portion of the term of this patent subsequent to Feb. 29, 1989, has been disclaimed.

[22] Filed: Nov. 19, 1971

[21] Appl. No.: 200,509

[52] U.S. Cl. .............. 423/242; 423/541; 423/547
[51] Int. Cl. .................. C01b 53/34; C01b 17/60
[58] Field of Search ........... 423/242, 550, 539, 541, 423/520, 547, 237, 239

[56] References Cited
UNITED STATES PATENTS

| | | |
|---|---|---|
| 2,862,789 | 12/1958 | Burgess.............................. 423/550 |
| 3,344,585 | 10/1967 | Hallowell........................... 423/237 |
| 3,607,003 | 9/1971 | Stotler............................... 423/229 |
| 3,645,671 | 2/1972 | Griffin, Jr. et al................. 423/242 |

*Primary Examiner*—Earl C. Thomas
*Attorney, Agent, or Firm*—Louis F. Kreek

[57] ABSTRACT

Flue gas is desulfurized by absorption in an aqueous ammonium sulfite-ammonium bisulfite solution. Any ammonia which is picked up in the flue gas during desulfurization is removed by scrubbing the flue gas with wash water. Sulfur dioxide is recovered from the absorber effluent solution by acidifying a portion thereof with ammonium bisulfate, crystallizing and decomposing the ammonium sulfate thus formed, reacting the ammonia formed during decomposition with a second portion of the absorber effluent solution to form fresh ammonium sulfite-ammonium bisulfite solution.

7 Claims, 2 Drawing Figures

FLUE GAS DESULFURIZATION WITH AMMONIUM SULFITE-BISULFITE SOLUTION

BACKGROUND OF THE INVENTION

This invention relates to processes for removal of sulfur dioxide from flue gas, and more particularly to processes in which sulfur dioxide is removed by contact with an aqueous absorbent.

Sulfur dioxide has become a major pollutant of the atmosphere, particularly in urban areas. The presence of sulfur dioxide in the atmosphere is due primarily to the combustion of fossil fuels, i.e., coal and oil, which contain sulfur. Electric power plants constitute a major source of sulfur dioxide pollution of the atmosphere.

Various processes have been suggested for removal of sulfur dioxide from flue gas, although none has gained a general industry acceptance to date. These processes may be grouped generally as wet processes and dry processes. Wet processes are those which employ an absorbent solution, usually aqueous, for the removal of sulfur dioxide from a gas stream.

A flue gas desulfurization process has several requirements. First, it must be capable of removing most of the sulfur dioxide content of the flue gas, preferably 90% or more of the $SO_2$ present, under widely varying load conditions. Second, it should not create any air or water pollution problems. Third, the process should be easy to operate and maintain. The process should have a low net cost. In many instances this would require the production of a salable byproduct. The process should be capable of incorporation into existing power plants if it is to achieve maximum application. This requirement favors wet processes, which operate at a low temperature and therefore can be placed after the conventional air preheater in which incoming air for combustion is heated by the hot flue gas. Dry processes usually require much higher operating temperature, and therefore must be inserted ahead of the preheater and integrated with the power plant.

Various wet processes have been described in the art, as for example those described in Hixson et al., U.S. Pat. No. 2,405,747, issued Apr. 13, 1946; Johnstone et al. U.S. Pat. No. 2,134,481, issued Oct. 25, 1938; and Johnstone U.S. Pat. No. 2,676,090, issued Apr. 20, 1954. Hixson et al describe the use of aqueous ammonia as the absorbent. Johnstone et al. U.S. Pat. No. 2,134,481 describes the use of an aqueous ammonium sulfite solution as the absorbent, and regenerates the scrubber effluent by boiling. Johnstone U.S. Pat. No. 2,676,090 describes the use of different ammonium sulfite-ammonium bisulfite solutions of varying $NH_3:SO_2$ ratios in varying concentrations in a multistep scrubbing process.

A particularly preferred process for removing sulfur dioxide from flue gas and for obtaining by-product sulfur dioxide is described and claimed in our copending application Ser. No. 869,226, filed Oct. 24, 1969. An aqueous ammonium sulfite-ammonium bisulfite solution is used as the absorption agent for $SO_2$ in this process.

Some ammonia is likely to enter the flue gas as it is being desulfurized in any of the foregoing flue gas desulfurization processes. The present invention provides a process in which ammonia as well as sulfur dioxide is removed from flue gas prior to its discharge into the atmosphere. In particular, the process of the present invention is an improvement on the process described and claimed in our copending application Ser. No. 869,226, supra.

SUMMARY OF THE INVENTION

According to the present invention, sulfur dioxide is removed from flue gas by contacting a flue gas stream in an absorber with an aqueous solution of ammonium sulfite and ammonium bisulfite which has an initial pH of about 6 to about 7. Then the desulfurized flue gas is passed from the absorption zone to a wash zone where it is contacted with wash water in order to remove ammonia therein which is picked up during sulfur dioxide removal. A flue gas stream of substantially reduced sulfur dioxide content and very low ammonia content is discharged to the atmosphere. The absorber effluent solution from the sulfur dioxide absorber is treated in order to recover by-product sulfur dioxide therefrom.

THE DRAWING

This invention will now be described in further detail with reference to the accompanying drawing, in which:

FIG. 1 is a flow sheet showing a preferred embodiment of the process of the present invention; and FIG. 2 is a partial flow sheet of a second embodiment of the process of this invention.

DESCRIPTION OF THE PREFERRED EMBODIMENT

This process is generally applicable to treatment of waste gas streams containing sulfur dioxide as an undesired impurity. This invention is especially useful in treating flue gas streams which are formed by combustion of fossil fuels, i.e., coal and oil, which contain sulfur. Such flue gas streams generally contain up to about 0.3% by volume of sulfur dioxide, some free oxygen due to the use of excess combustion air, and small amounts of fly ash.

The process of this invention includes the steps of (1) absorbing sulfur dioxide in an aqueous ammonium sulfite-ammonium bisulfite absorbent solution; (2) washing the desulfurized flue gas with wash water in order to remove any ammonia which is picked up during desulfurization; (3) acidifying a portion of the absorber effluent solution to liberate sulfur dioxide; (4) decomposing the ammonium sulfate formed in step (3) to form ammonia and ammonium bisulfate; and (5) reacting the ammonia with a second portion of the absorber effluent solution to prepare fresh ammonium sulfite-ammonium bisulfite absorbent solution. The principal reactions taking place in these five steps are as follows:

(1)   $(NH_4)_2SO_3 + SO_2 + H_2O \rightarrow 2NH_4HSO_3$
(2)   $NH_3 + H_2O \rightarrow NH_4OH$
(3)   $NH_4HSO_3 + NH_4HSO_4 \rightarrow (NH_4)_2SO_4 + SO_2 + H_2O$
(4)   $(NH_4)_2SO_4 \rightarrow NH_4HSO_4 + NH_3$
(5)   $NH_4HSO_3 + NH_3 \rightarrow (NH_4)_2SO_3$ The process will now be described in greater detail with reference to FIG. 1 of the accompanying drawing.

Figure 1:
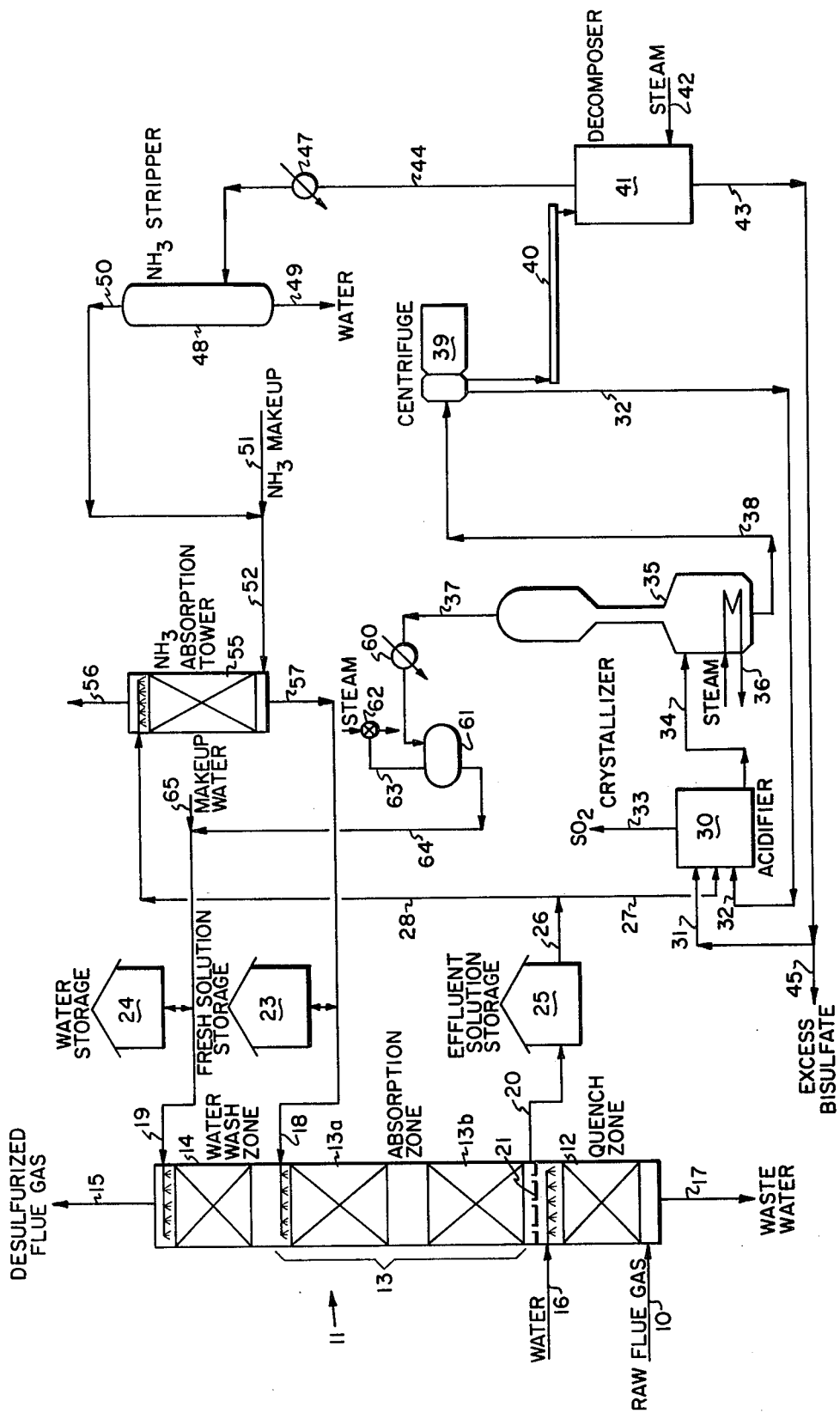

Referring to FIG. 1, a raw flue gas stream containing sulfur dioxide is introduced through inlet 10 into the base of a scrubbing tower 11, which contains, in ascending order (i.e., in the direction of flue gas flow), a quench stage 12, a sulfur dioxide absorption zone 13 having upper and lower stages 13a and 13b, respectively, and a single stage wash zone 14. Desulfurized and substantially ammonia free flue gas is discharged to the atmosphere through gas outlet 15. Each of the stages in tower 11 can be packed with a suitable packing material, such as Raschig rings or Berl saddles in order to improve gas-liquid contact.

Raw flue gas, initially at a temperature of approximately 300°F., is introduced through inlet 10 into quench stage 12, where it is quenched and humidified by countercurrent contact with water introduced through quench water inlet 16. This operation cools the flue gas stream to a suitable temperature for $SO_2$ removal, i.e., typically about 86°F. (30°C.) to about 140°F. (60°C.). Quenching also removes solid particles such as fly ash, which are present in small amount. Waste water is removed from the bottom of the quench stage 12 via outlet 17 at the bottom of tower 11. This water may be neutralized and conveyed to a settling pond to permit fly ash to settle out.

Quenched flue gas from quench stage 12 is introduced into the absorption zone 13, where it is contacted with an aqueous solution formed by dilution of a concentrated ammonium sulfite-ammonium bisulfite solution introduced through inlet 18 and with waste water introduced through inlet 19. Inlets 18 and 19 are located at the top of absorption zone 13 and at the top of tower 11, respectively. The diluted solution initially has a pH of about 6 to about 7. Countercurrent contact between the flue gas and the absorbent solution removes a substantial portion (e.g., typically about 90%) of the sulfur dioxide content of the flue gas stream. A small portion of the absorbed $SO_2$, typically about 5 to 10%, is oxidized to the hexavalent state in absorber 11. This oxidation takes place because of the presence of oxygen in the flue gas. The use of an ammonium sulfite-ammonium bisulfite solution instead of ammonia as the absorbent minimizes the quantity of ammonia picked up by the flue gas stream during desulfurization. However, some ammonia is picked up by the flue gas stream even when using the ammonium sulfite-ammonium bisulfite solution described herein. The present invention provides the means for removing most of this ammonia prior to discharge of the desulfurized flue gas into the atmosphere.

Desulfurized flue gas passes from the absorption zone 13 upwardly to a water wash zone 14, where it is countercurrently contacted with the wash water or other aqueous wash medium introduced through inlet 19. Essentially pure water is the preferred wash medium, although a very dilute acidic aqueous solution, such as dilute sulfuric acid or a small portion of the absorber effluent solution from absorption zone 13 diluted with water, can be used as the wash medium if desired. Desulfurized flue gas is discharged from the wash stage 14 through the outlet 15 at the top of tower 11. Desulfurized flue gas typically has a sulfur dioxide content no greater than 10% of the original sulfur dioxide content of the entering flue gas, and a virtually negligible ammonia content.

An aqueous absorber effluent solution containing ammonium bisulfite as its principal solute is removed at the lower end of absorption zone 13 via effluent solution outlet line 20. A perforated plate 21 having chimney risers is placed between the quench stage 12 and the absorption zone 13, permitting the ascent of flue gas through tower 11 but preventing the descent of liquid into the quench stage 12.

All of the wash water introduced through inlet pipe 19 at the top of tower 11 is allowed to flow downwardly therethrough, so that this wash water mixes with and dilutes the fresh absorbent solution which enters via inlet 18.

In order to improve gas-liquid contact in tower 11, it is desirable to recirculate a portion, and generally a substantial portion, of the absorber effluent solution withdrawn through line 20. Effluent solution may be recirculated to the top of the upper stage 13a; alternatively, and preferably, a pair of recirculation loops may be provided so that the absorbent solution at the bottom of each of the stages 13a and 13b is recirculated to the top of that stage. Recirculation lines have been omitted for the sake of clarity.

Fresh absorbent solution and wash water can be supplied to inlets 18 and 19, respectively, from storage tanks 23 and 24, respectively.

Instead of the absorption tower 11, other multiple stage countercurrent gas-liquid contact devices, such as a series of venturi scrubbers, may be used.

The fresh absorbent solution, or lean solution, entering the tower 11 through inlet 18 contains from about 17 to about 22 moles of ammonia per 100 moles of water and from about 9 to about 12 moles of sulfur dioxide per 100 moles of water. The pH of this solution is preferably about 6 to about 7. The ratio of sulfur dioxide to ammonia in the entering solution cannot exceed 1:1 (equivalent to ammonium bisulfite), and at the indicated pH range of about 6 to 7, will contain more than 0.5 moles of $SO_2$ per mole of $NH_3$ (equivalent to ammonium sulfite) but less than about 0.67 moles of $SO_2$ per mole of $NH_3$. In other words, the principal solute in the entering solution is ammonium sulfite, with lesser amounts of ammonium bisulfite also present. In addition, the entering solution contains small amounts of ammonium sulfate, due to oxidation of $SO_2$ in the absorption zone and recirculation of solution throughout the system.

The absorber effluent solution, a rich solution, in line 20, is primarily aqueous ammonium bisulfite with some ammonium sulfite present. Also, some ammonium sulfate is present due to the oxidation of a portion of the $SO_2$ to $SO_3$ in absorption zone 13. This effluent solution typically contains from about 11 to about 18 moles of $NH_3$ per 100 moles of water, from about 8 to about 16 moles of $SO_2$ per 100 moles of water.

It is desirable to vary the rate of introduction of fresh absorbent solution via line 18 in proportion to the rate at which $SO_2$ enters with the raw flue gas. The rate at which $SO_2$ enters is the product of the total flue gas rate multiplied by the percentage of $SO_2$ in the flue gas. Considerable variation in the flue gas rate normally occurs in the course of a day at an electric power plant because of varying power requirements. Also, the $SO_2$ content of the flue gas can change when different lots of feed are used.

The absorber effluent solution which is withdrawn through line 20 (except for the portion which is recirculated) is continuously introduced into an absorber effluent solution storage tank 25. Naturally, the rate of introduction of solution into this tank will be highest when the rate of introduction of fresh solution via line 18 is highest, i.e., at peak load times and where fuel sulfur content is the highest. Although the solution rate in tower 11 varies in accordance with the $SO_2$ load, it is desirable to operate the entire solution regeneration and $SO_2$ recovery portion of the system at an essentially constant flow rate. Therefore, absorber effluent solution is withdrawn from storage tank 25 via line 26 at an essentially constant flow rate. The entire regeneration portion of the system, i.e., the portion to the right of storage tanks 23, 24 and 25 in FIG. 1, is preferably operated at as nearly constant a flow rate as possible.

The absorber effluent solution withdrawn from tank 25 is divided into two portions. Conduits 27 and 28 receive the first and second portions, respectively, of the absorber effluent solution from line 26.

The first and smaller portion of the absorber effluent solution is passed through conduit 27 into an acidifier 30. Molten ammonium bisulfate and saturated aqueous ammonium bisulfate solution are introduced into the acidifier 30 through inlet lines 31 and 32, respectively. The acidifier 30 is preferably operated at a temperature of about 200°F. to about 225°F., and the heat released in the acidifier is supplied principally by the heat content of the molten ammonium bisulfate. The reaction of ammonium bisulfate with ammonium bisulfite in acidifier 30 liberates sulfur dioxide, which is removed from the acidifier through overhead line 33. The sulfur dioxide in line 33 contains some water, whose quantity is determined by the amount of evaporation taking place in the acidifier 30. This sulfur dioxide can be converted to sulfuric acid or to elemental sulfur as desired, or can be dried, compressed, and sold as $SO_2$.

Liberation of sulfur dioxide in acidifier 30 results in the formation of ammonium sulfate as a by-product. At least a portion, and preferably all of this ammonium sulfate, is in aqueous solution. However, if enough water is evaporated, some of the ammonium sulfate formed in the acidifier will remain undissolved. The solution in acidifier 30 will usually also contain some ammonium bisulfate due to an excess of ammonium bisulfate introduced into the acidifier.

The solution formed in acidifier 30 is conveyed through a solution effluent line 34 to crystallizer 35, which is heated by a steam heating coil 36 near the base thereof. A portion of the water in solution 34 is removed overhead from the crystallizer 35 via overhead line 37. A flowable slurry of ammonium sulfate is removed from the bottom of crystallizer 35 via line 38. This slurry contains dissolved ammonium sulfate, crystals of ammonium sulfate, and a small amount of dissolved ammonium bisulfate. This slurry is pumped into centrifuge 39, where crystals of ammonium sulfate are separated from the mother liquor, which is an aqueous solution of ammonium sulfate containing a small amount of ammonium bisulfate. The mother liquor is recycled via line 32 to acidifier 30. The ammonium sulfate crystals are conveyed on conveyor belt 40 to the decomposer 41, where the ammonium sulfate is decomposed into ammonium bisulfate and gaseous ammonia.

Decomposer 41 is directly heated by electrical immersion heaters (not shown) to about 600° to about 880°F., preferably about 700° to about 800°F. Stripping steam at about 720°F. is introduced through line 42. Under these conditions ammonium sulfate is decomposed into ammonium bisulfate and ammonia. Higher temperatures are avoided because of side reactions. Decomposition of ammonium sulfate into ammonium bisulfate and ammonia is usually not quite complete. For example, conversions of about 85% are typical. A melt of ammonium bisulfate containing a small amount of ammonium sulfate dissolved therein is withdrawn from the bottom of the decomposer 41 through line 43.

Gaseous ammonia and steam are withdrawn overhead from decomposer 41 through overhead line 44.

The molten ammonium bisulfate-ammonium sulfate mixture (typically about 85% by weight ammonium bisulfate) in line 43 is split into two streams. The major stream 31 is recycled via line 31 to the acidifier 30 for neutralization of ammonium bisulfite and liberation of sulfur dioxide as previously described. A minor stream, containing a quantity of sulfate equivalent to the quantity of $SO_3$ in the flue gas entering absorption section 13 of absorber 11 (which quantity is usually small) plus the quantity produced by oxidation in absorber 11, is withdrawn from the system through exit line 45. This ammonium bisulfate may be recovered as such or converted as desired into other useful by-products.

The gaseous overhead stream 44 containing ammonia and steam is cooled by cooler 47 in order to cool the gas and to condense the water content thereof. The pressure of the gas stream is reduced and the gas stream is introduced into ammonia stripper 48. The condensed water is removed as bottoms through line 49. An overhead of gaseous ammonia containing only a small amount of water vapor is removed through line 50. This ammonia, together with makeup ammonia introduced through line 51 as required, is conveyed through line 52 to ammonia absorption tower 55. The second portion of absorber effluent solution in line 26 is introduced to the top of tower 55, where it is countercurrently contacted by the ammonia stream from line 52. The absorption tower 55 has an overhead vent 56 for uncondensed gases and water vapor, although ordinarily the flow in vent 56 is negligible. Fresh absorbent solution of ammonium sulfite and ammonium bisulfite having a pH of about 6 to 7 is prepared in tower 55 and withdrawn therefrom as bottoms through bottoms line 57. This solution may be conveyed to fresh solution storage tank 23. Fresh solution is withdrawn from storage tank 23 and introduced into the absorber 11 through inlet line 18 as required. When the demand for absorbent solution in the tower 11 is equal to the flow rate in line 57, the fresh solution may flow directly from line 57 to line 18, bypassing the storage tank 23. However, in times of heavy sulfur dioxide load, corresponding to periods of heavy power demands and/or the use of fuel of especially high sulfur content, the demand for solution in line 18 will exceed the uniform flow rate in line 57, and additional solution will be withdrawn from tank 23. At times of slack sulfur dioxide load, i.e., at times of low demand for electrical power or when burning low sulfur fuel, solution will flow from line 57 into storage tank 23 and be stored there for future use.

Water vapor removed in the crystallizer overhead line 37 is cooled to a temperature below the boiling point in cooler 60 and collected in condenser 61, which is connected to a steam eductor 62 by an overhead line 63. Water condensate is conveyed from condenser 61 via line 64 to water storage tank 24. A small amount of make-up water as required is introduced into the system via line 65. This can be taken from the stripper condensate in line 49 if desired.

It will be seen that the acidifier 30, decomposer 41, and the ammonia absorption tower 55 are operated at substantially constant flow rates, even though the flow rate of both flue gas and absorbent liquid in absorber 11 may vary widely. This is made possible by the use of an aqueous ammonium sulfite-ammonium bisulfite solution rather than gaseous ammonia as the absorbent in absorber 11, and by the use of storage tanks 23, 24 and 25 for fresh absorbent solution, water and absorber effluent solution, respectively, between the sulfur dioxide absorber 11 and the rest of the system. These storage tanks in effect divide the system into a sulfur dioxide absorption section and a regeneration-sulfur dioxide recovery section, the latter lying to the right of the storage tanks as seen in FIG. 1. Ammonium sulfite-bisulfite solution can be conveniently stored in storage tank 23 in aqueous solution, while gaseous ammonia would have to be used as it is produced. In times of heavy gas flow through absorber 11, as for example when an electric power generating plant which releases flue gas is operating at capacity and/or when the sulfur content of the fuel is high, fresh solution is withdrawn from tank 23 faster than it is supplied thereto, and effluent solution flows into tank 25 faster than it is withdrawn therefrom. Conversely, at times of low flow rate in absorber 11, e.g., during a low load period in an electric power generating plant or when the sulfur content of the fuel is low, effluent solution is withdrawn from tank 25 faster than it enters therein, and the supply of fresh solution in tank 23 is replenished.

A further advantage of the regeneration system described herein is its low heat requirement. The instant regeneration process requires substantially less heat than does boiling of the absorber effluent solution to recover sulfur dioxide.

A still further advantage of the system of this invention is that the amount of ammonium bisulfate byproduct is quite low. This is important because the demand for ammonium sulfate and ammonium bisulfate is generally low, and the cost of converting these products into other more useful materials is generally comparatively high.

Figure 2:
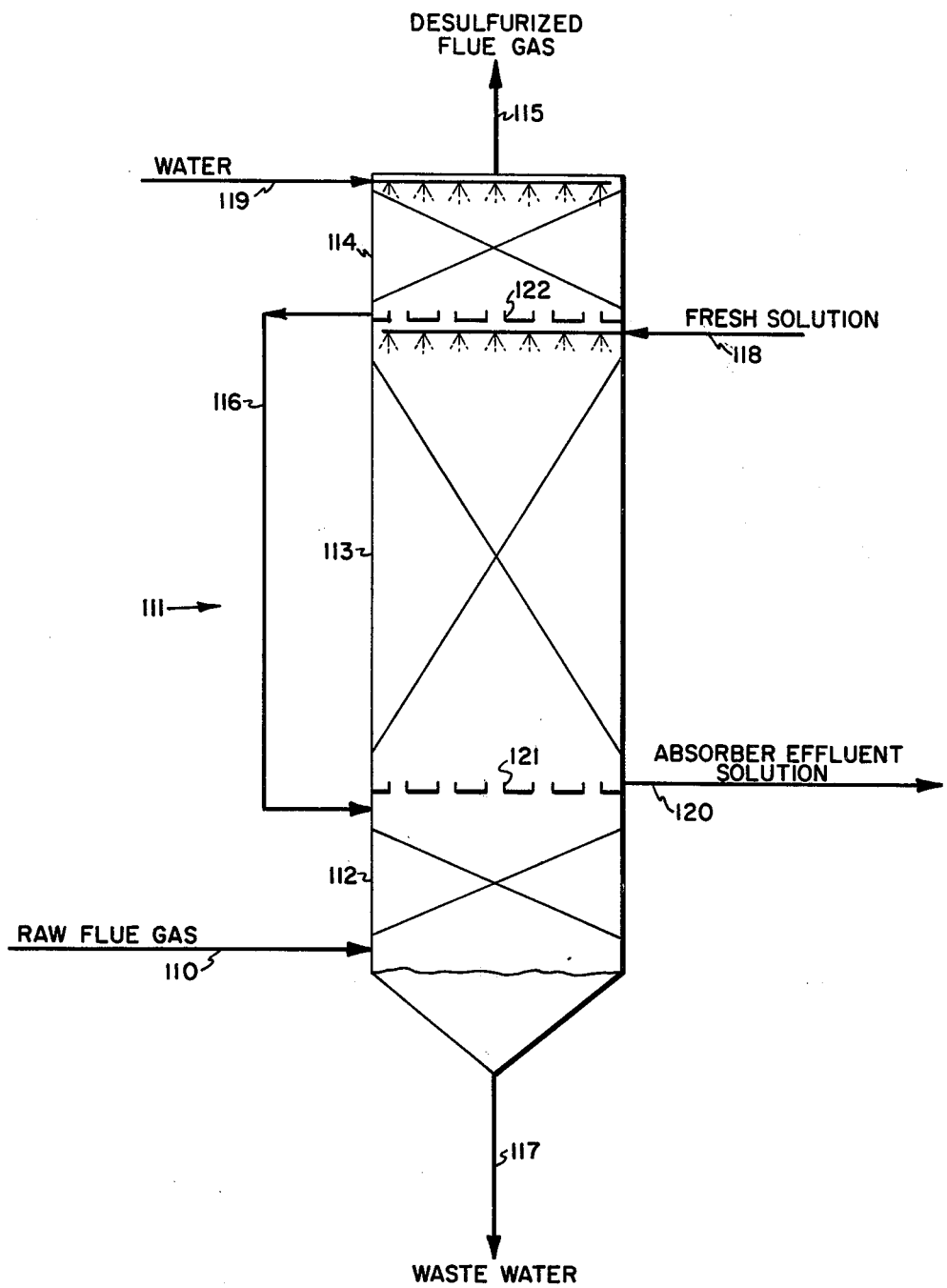

FIG. 2 illustrates a modified form of the present invention. In the embodiment of FIG. 2, the wash water is also used as the cooling water in the quench cooling stage, and is not mixed with the fresh absorbent solution. The pH range is also about 6 to about 7 and the mole ratio of $SO_2$ to $NH_3$ is about the same as in the embodiment of FIG. 1. The absorber effluent solution in the embodiment of FIG. 2 preferably has essentially the same composition as in the embodiment of FIG. 1. Only the sulfur dioxide scrubbing tower in FIG. 2 is illustrated, since the entire regeneration portion of the system, i.e., the portion of the system to the right of storage tanks 23, 24 and 25, is preferably the same as in FIG. 1.

Referring now to FIG. 2, raw flue gas containing sulfur dioxide flows through gas inlet 110 into a vertical absorption tower 111. The tower 111 contains, in ascending order (i.e., in the direction of flue gas flow), a quench cooling zone 112, a sulfur dioxide absorption zone 113, and a wash zone 114. Desulfurized flue gas is discharged via outlet 115. Zones 113 and 114 may be packed with suitable packing material such as Raschig rings or Berl saddles, in order to improve gas-liquid contact.

Raw flue gas containing sulfur dioxide, initially at a temperature of approximately 300°F., is introduced into the base of tower 111 via inlet line 110. The flue gas is quench cooled in zone 112 to a suitable temperature for sulfur dioxide absorption, i.e., about 86°F. (30°C.) to about 140°F. (60°C.). Quench water for cooling the hot flue gas is introduced through line 116.

Waste water is discharged through line 117. The quench cooled flue gas ascends from zone 112 to absorption zone 113, where the major portion of its sulfur dioxide content, i.e., typically about 90%, is removed by countercurrent contact with an ammonium sulfite-ammonium bisulfite solution introduced through inlet 118 and initially having a pH of about 6 to about 7. Some ammonia is ordinarily picked up by the flue gas during this absorption operation. Finally, the flue gas ascends into wash zone 114, where it is washed with water introduced through inlet 119, in order to remove most of the ammonia picked up in absorption zone 113. Flue gas of substantially reduced sulfur dioxide content and virtually negligible ammonia content is discharged to the atmosphere through outlet 115. Absorber effluent solution is discharged from absorption zone 113 of tower 111 via exit line 120. Perforated plate 121, which has chimney risers, prevents absorbent solution from descending into quench zone 112 while permitting the gas to rise.

According to the embodiment shown in FIG. 2, wash water, introduced to the top of the tower 111 via inlet 119, is directed by perforated plate 122 into a pipeline 116 which is located externally of the tower 111. The wash water, which now contains a small quantity of dissolved ammonia and sulfur dioxide picked up in wash zone 114, re-enters the tower 111 at the top of quench zone 112, bypassing $SO_2$ absorption zone 113. The slight ammonia content is not deleterious; in fact, it is advantageous because it reacts with sulfur trioxide which is normally present in small amounts in flue gas. Waste water is discharged from the bottom of tower 110 through outlet pipe 117. This waste water can be sent to a settling pond to permit settling out of the ash content, or can be sent to a cooling tower.

The fresh aqueous absorbent solution as it enters the tower 111 through inlet pipe 118 has a pH of about 6 to about 7. The mole ratios of $NH_3:H_2O$, $SO_2:H_2O$ and $SO_2:NH_3$ may be in the same range as in FIG. 1. The absorption zone 113 may consist of two or more stages (usually no more than four) rather than the single stage illustrated. The fresh absorbent solution can be introduced at a plurality of spaced points, i.e., at the top of each stage, rather than at a single point at the top of the entire absorption zone as shown. Recirculation lines for absorbent solutions have been omitted in the interest of clarity. However, for good liquid and gas contact it is generally desirable to recirculate a large part of the absorbent solution in absorption zone 113. Where the absorption zone 113 is divided into a plurality of stages, recirculation of liquid is preferably from the bottom to the top of each stage, rather than from the bottom to the top of the entire absorption zone.

The regeneration section of the embodiment of the invention shown in FIG. 2 can be and preferably is identical to the regeneration section illustrated in FIG. 1. Thus, the entering fresh absorbent solution can be obtained from a storage tank such as tank 23 in FIG. 1, and the absorber effluent solution in line 120 can be directed to a storage tank such as tank 25 in FIG. 1. Absorber effluent solution in line 120 is treated as described in FIG. 1 to recover $SO_2$ and to regenerate fresh absorbent solution. The only modification of the regeneration portion of the system shown in FIG. 1 is that the flow rates in certain streams may be greater when the $SO_2$ scrubber 111 shown in FIG. 2 is used.

Auxiliary equipment such as pumps and valves has been omitted from the drawing for the sake of clarity.

This invention will now be illustrated with reference to the examples which follow.

EXAMPLE 1

This example illustrates a preferred embodiment of the invention, carried out according to the flow sheet shown in FIG. 1.

Flue gas flowing at a rate equivalent to 14272 pound moles of dry flue gas per hour and containing a small quantity (about 0.3% by volume) of sulfur dioxide is introduced via line 10 at a temperature of about 300°F. into the base of an absorber 11. This flue gas stream is quench cooled to 131°F. and saturated with water vapor by water introduced at 16. The quench cooled flue gas ascends into the $SO_2$ absorption zone 13 of tower 11, where it is countercurrently contacted with an ammonium sulfite-ammonium bisulfite solution introduced at the top of the absorption zone through line 18. This entering solution contains 10.4 moles of $SO_2$ per 100 moles of water, 19.9 moles of $NH_3$ per 100 moles of water, and 0.54 moles of ammonium sulfate per 100 moles of water, and has an $SO_2:NH_3$ mole ratio of 0.52 (indicating that the principal solute is ammonium sulfite, with small amounts of ammonium bisulfite also present) and a pH of about 6.7. The wash water entering at the top of the tower through line 19 is essentially pure water. The temperatuare in both the absorption section 13 and the wash section 14 is 131°F. Desulfurized flue gas containing about 0.03% by volume $SO_2$ (representing a removal of about 90%) and about 0.002% by volume of ammonia is discharged to the atmosphere through opening 15 at the rate of 16880 moles (482232 pounds) per hour. (The dry flue gas flow rate, representing all gases except water, $SO_2$ and $NH_3$ in lines 10 and 15, is 14272 moles per hour).

Absorber effluent solution is withdrawn from tower 11 through line 20. This absorber effluent solution is predominantly ammonium bisulfite containing 10.4 moles of $SO_2$ per 100 moles of water, 12.9 moles of $NH_3$ per 100 moles of water, 0.55 moles of ammonium sulfate per 100 moles of water, and having an $SO_2:NH_3$ mole ratio of 0.81. This absorber effluent solution flows into absorber effluent solution storage tank 25.

Absorber effluent solution flows out of storage tank 25 into line 26, and is divided into two streams 27 and 28. Stream 27 flows into acidifier 30. Also introduced into acidifier 30 are molten ammonium sulfate (containing 15% ammonium bisulfate) via line 31, and saturated aqueous ammonium sulfate solution via line 32. Sulfur dioxide liberated in the acidifier is withdrawn overhead through line 33. An aqueous ammonium sulfate solution, formed as a by-product in acidifier 30, is removed therefrom through line 34. This solution also contains a small amount of ammonium bisulfate due to the use of a slight excess of ammonium bisulfate in the acidifier. This ammonium sulfate solution is introduced into the steam heated crystallizer 35, which is operated at 20 psig and 212°F. Part of the water of solution is vaporized and withdrawn overhead through line 37. A slurry of ammonium sulfate is conveyed through line 38 from the bottom of crystallizer 35 to a centrifuge 39. There crystals of ammonium sulfate are separated from the mother liquor, and the latter is recycled to the acidifier via line 32. The crystals of ammonium sulfate are introduced via conveyor 40 into decomposer 41, which is directly heated by electrical immersion heaters (not shown). Stripping steam at 55 psia and about 720°F. is introduced through pipe 42. About 85% of the entering ammonium sulfate is decomposed into ammonium bisulfate and ammonia, which forms as a melt containing the undecomposed ammonium sulfate in solution. A melt of anhydrous ammonium bisulfate and ammonium sulfate (15% ammonium sulfate, 85% ammonium bisulfate) is withdrawn from the bottom of the decomposer 41 via line 43 at 725°F. and 50 psia. Most of this melt is recycled to acidifier 30. A small portion, equivalent to the $SO_2$ oxidized to $SO_3$ in absorber 11 plus the $SO_3$ entering absorber section 13 with the flue gas, is removed from the system via line 45.

Gaseous ammonia formed in decomposer 41, together with steam, is removed overhead through line 44, and is cooled to 105°F. and throttled down to atmospheric pressure, then introduced into ammonia stripper 48. Most of the water content of stream 44 is removed from the bottom of the stripper via line 49. The ammonia is removed overhead via line 50, combined with makeup ammonia entering via line 51, and the ammonia stream is introduced through line 52 into the ammonia absorption tower 55.

Ammonia from line 52 is countercurrently contacted in tower 55 with ammonium bisulfite solution introduced through line 28, forming an aqueous ammonium sulfite solution containing small amounts of ammonium bisulfite and ammonium sulfate, and having the same composition as the fresh ammonium sulfite solution entering via line 18. This bottoms solution 57 is introduced into the storage tank 23, from which it is withdrawn as demand requires and conveyed via line 18 to absorption tower 11.

Stream quantities in pound moles per hour at an intermediate demand load (when the solution flow rate into storage tank 25 from line 20 is equal to the flow rate of solution out of storage tank 25 via line 26) are shown in Table I below.

TABLE I

Stream quantities in pound moles per hour. Reference numerals refer to drawing.

| Reference Numeral | $SO_2$ | $NH_3$ | $H_2O$ | $NH_4HSO_4$ | $(NH_4)_2SO_4$ |
|---|---|---|---|---|---|
| 10 | 53.4 | | 1410 | | |
| 15 | 5.1 | 0.4 | 2602 | | |
| 16 | | | 1252 | | |
| 17 | | | 60 | | |
| 18 | 91.8 | 175.3 | 881.5 | | 4.8 |
| 19 | | | 436.1 | | |
| 20 | 137.7 | 170.1 | 1317.6 | | 7.2 |
| 27 | 45.9 | 56.7 | 439.2 | | 2.4 |
| 28 | 91.8 | 113.4 | 878.4 | | 4.8 |
| 31 | | | | 56.8 | 10.0 |

TABLE I—Continued

Stream quantities in pound moles per hour. Reference numerals refer to drawing.

| Reference Numeral | $SO_2$ | $NH_3$ | $H_2O$ | $NH_4HSO_4$ | $(NH_4)_2SO_4$ |
|---|---|---|---|---|---|
| 32 | | | 763.8 | 5.5 | 95.7 |
| 33 | 45.9 | | 1.7 | | |
| 34 | | | 1201.3 | 5.6 | 164.8 |
| 37 | | | 432.3 | | |
| 38 | | | 769.0 | 5.6 | 96.4 solution |
|   |   |   |   |   | 68.4 crystals |
| 40 | | | 5.2 | 0.1 | 0.7 solution |
|   |   |   |   |   | 68.4 crystals |
| 42 | | | 101.4 | | |
| 43 | | | | 58.8 | 10.4 |
| 44 | | 58.7 | 106.6 | | |
| 45 | | | | 2.0 | 0.4 |
| 49 | | 0.1 | 103.5 | | |
| 50 | | 58.6 | 3.1 | | |
| 51 | | 3.3 | | | |
| 57 | 91.8 | 175.3 | 881.5 | | 4.8 |
| 65 | | | 3.8 | | |

Quantities of $NH_3$ as shown in Table I and elsewhere in Example 1 refer only to $NH_3$ present as ammonium sulfite or bisulfite, and do not include ammonia which is present as ammonium sulfate or bisulfate.

in Table II below. Except as indicated in Table II below, flow rates in the regeneration section of the system (the portion to the right of storage tanks 23 and 25 in FIG. 1) are the same in this example as in Example 1.

TABLE II

| Reference Numeral | $SO_2$ | $NH_3$ | $H_2O$ | $(NH_4)_2SO_4$ | Dry Flue Gas |
|---|---|---|---|---|---|
| 110 | 53.4 | | 1410 | | 14272 |
| 115 | 5.1 | 0.05 | 2602 | | 14272 |
| 116 | 27.9 | 33.6 | 1688 | | |
| 117 | | | 60 | 0.23 | |
| 118 | 127.0 | 218.9 | 1215.1 | 6.6 | |
| 119 | | | 1688 | | |
| 120 | 172.9 | 213.7 | 1651 | 9.0 | |
| 28* | 127.0 | 157.0 | 1212.0 | 6.6 | |
| 57* | 127.0 | 218.9 | 1215.1 | 6.6 | |
| 65* | | | 1256 | | |

*FIG. 1

EXAMPLE 2

Desulfurization of flue gas is carried out according to this example following the flow sheet shown in FIG. 2.

Raw flue gas is introduced at a temperature of about 300°F. through inlet pipe 110 into a quench cooling zone 112 in tower 111. The flue gas is cooled to a temperature of 131°F. with water admitted at the top of cooling zone 112 through pipe 116. This cooling water enters the tower 111 via inlet 119 and flows first through the ammonia wash zone 114 and then through the cooling zone 112, bypassing the sulfur dioxide absorption zone 113. Waste water is discharged through the outlet 117 at the bottom of tower 111. The cooled flue gas ascends from zone 112 into $SO_2$ absorption zone 113, where it is contacted countercurrently with ammonium sulfite solution containing small amounts of ammonium bisulfite and ammonium sulfate, introduced via pipe 118 at the top of the zone 113. The temperature of the solution entering through pipe 118 is such as to cool the flue gas at this location in the tower to 127°F. About 90% of the $SO_2$ content of the flue gas is removed in zone 113. Desulfurized and substantially ammonia-free flue gas is discharged through outlet 115.

Fresh absorbent solution is delivered from storage tank 23 (FIG. 1) to inlet pipe 118. Absorber effluent solution in line 120 is conveyed to storage tank 25 (FIG. 1) and treated as described in Example 1 to recover by-product $SO_2$, except that the flow in line 28 and correspondingly in line 57 is increased and the water addition through line 65 is also increased.

Stream quantities in pound moles per hour are shown

Alternatively, the absorber effluent solution in line 120 can be treated to recover $SO_2$ and regenerate fresh solution according to the process described in our copending application Ser. No. 869,226, filed Oct. 24, 1969, now U.S. Pat. No. 3,645,671.

What is claimed is:

1. A process for removing sulfur dioxide from flue gas which comprises:

a. introducing a stream of flue gas containing sulfur dioxide into an absorption zone;

b. contacting said flue gas in said absorption zone with an aqueous solution of ammonium sulfite and ammonium bisulfite initially having a pH from about 6 to about 7 in order to remove sulfur dioxide therefrom;

c. passing desulfurized flue gas from said adsorption zone to a wash zone;

d. contacting said desulfurized flue gas with wash water in said wash zone in order to remove ammonia therefrom;

e. discharging a flue gas stream of substantially reduced sulfur dioxide content from said wash zone;

f. withdrawing an aqueous absorber effluent solution containing ammonium bisulfite as the principal solute from said absorption zone;

g. dividing said absorber effluent solution into two portions and acidifying the first portion with ammonium bisulfate, thereby liberating sulfur dioxide and forming ammonium sulfate;

h. decomposing said ammonium sulfate at elevated temperature into ammonium bisulfate and gaseous ammonia in a decomposition zone;

i. reacting said gaseous ammonia with the second portion of said absorber effluent solution to prepare an aqueous solution of ammonium sulfite and ammonium bisulfite having a pH from about 6 to about 7; and
j. passing said aqueous solution prepared in step (i) to said absorption zone.

2. A process according to claim 1 in which said stream of flue gas is cooled by quenching with an aqueous medium prior to introduction into said absorption zone.

3. A process according to claim 2 in which the effluent wash water from said wash zone is the aqueous medium.

4. A process according to claim 1 in which the effluent wash water from said wash zone is introduced into said absorption zone and combined therein with said aqueous solution of ammonium sulfite and ammonium bisulfite.

5. A process according to claim 1 in which the aqueous absorber effluent solution is introduced into a storage tank, and is withdrawn from said storage tank at a substantially constant flow rate.

6. A process according to claim 1 in which at least a portion of the ammonium sulfate formed in step (g) is in aqueous solution and is crystallized from said solution by evaporating the water content thereof.

7. A process according to claim 6 in which the water evaporated from said solution is condensed and used as the wash water in said wash zone.

* * * * *